United States Patent [19]

Roth et al.

[11] Patent Number: 4,675,648
[45] Date of Patent: Jun. 23, 1987

[54] PASSIVE SIGNAL COUPLER BETWEEN POWER DISTRIBUTION SYSTEMS FOR THE TRANSMISSION OF DATA SIGNALS OVER THE POWER LINES

[75] Inventors: Roger R. Roth, Minnetonka; Gregory A. Hrdlicka, Plymouth, both of Minn.

[73] Assignee: Honeywell Inc., Waltham, Mass.

[21] Appl. No.: 601,186

[22] Filed: Apr. 17, 1984

[51] Int. Cl.[4] .......................................... H04M 11/04
[52] U.S. Cl. .................................................. 340/310 A
[58] Field of Search ....................... 340/310 A, 310 R; 323/361, 44; 455/73

[56] References Cited

U.S. PATENT DOCUMENTS 4,188,619  2/1980  Perkins ........................... 340/310 R
4,382,248  5/1983  Pai .................................. 340/310 A
4,433,284  2/1984  Perkins ........................... 340/310 R Primary Examiner—Douglas W. Olms
Assistant Examiner—Curtis Kuntz
Attorney, Agent, or Firm—George Grayson; John S. Solakian

[57] ABSTRACT

A passive signal coupler transfers data signals being transmitted over AC power lines from a first AC power distribution system to a second AC power distribution system. Each leg of the passive signal coupler coupled to a phase of the power line voltage includes a series LC circuit, tuned to the data signal carrier frequency. Each leg coupled to the first power system is terminated in a first winding of a transformer. Each leg coupled to the second power system is terminated in a second winding of the transformer.

14 Claims, 5 Drawing Figures

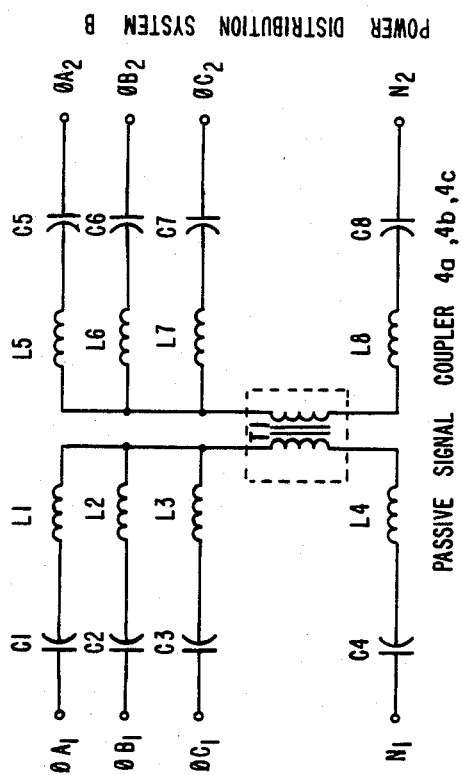
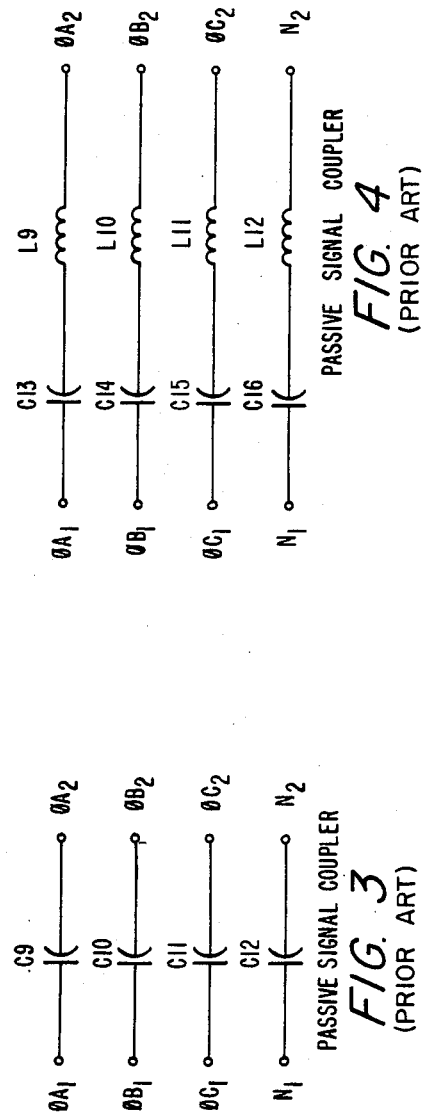
| RESONANT FREQUENCY | 130 KHZ | 233 KHZ |
|---|---|---|
| C1 – C8 | .056 μf | .033 μf |
| L1 – L8 | 27 μh | 15 μh |
FIG. 2
FIG. 3 (PRIOR ART)
FIG. 4 (PRIOR ART)

PASSIVE SIGNAL COUPLER BETWEEN POWER DISTRIBUTION SYSTEMS FOR THE TRANSMISSION OF DATA SIGNALS OVER THE POWER LINES

BACKGROUND OF THE INVENTION

1. Field of the Invention

This invention relates to the transmission of data signals over power lines, and more particularly to a passive signal coupler for transferring data signals between different power distribution systems.

2. Description of the Prior Art

The need for new, more effective control systems for building operations has never been greater. Now more than ever, businesses are turning to advanced central control technology to perform a number of tasks necessary for day-to-day operation. Until recently, however, the complexity and expense of system installation have prevented many building owners and managers from taking advantage of available technology. In many older buildings, it has proven too expensive or even impossible to install these systems because of hard-to-trace wiring or building construction obstacles. Even in newer buildings the cost of running hard control wiring to multiple remote points can be prohibitive. In either case, the costs associated with running wire are the most significant part of the cost of installation, in some buildings as much as 75 percent of the total cost.

Power line carrier systems effectively eliminate the need for major wiring jobs associated with control system installation. It utilizes the existing in-building AC power service to take the place of hard control wiring. The power line carrier systems can be used in a wide variety of applications, including environmental and energy management control, building and factory automation, remote lighting and process control. There are additional advantages for those who wish to employ control systems in temporary or leased locations. In these cases, the system can be moved easily to a new location or building, eliminating the need to rewire with every move or to leave the control wiring behind.

There are many advantages to using the power line carrier systems instead of hard wiring: installation becomes a much easier task; walls and ceilings are left intact; building occupants and tenants are not inconvenienced by messy installation and repair jobs; total installation costs are easier to estimate and control; and the control equipment may be moved about without rewiring.

Power line carrier systems are communication systems geared to pass commands from a master controller, typically a digital computer to energy-using devices. It is desirable to use the existing AC power lines for transmitting these commands between devices by using a radio frequency signal carrier. When large buildings or building complexes are involved, installation of the power line carrier system usually costs much less than installing new wiring between separate energy-using devices and the master controller.

It is likely that the transceivers that transmit and receive data signals are coupled to different power distribution systems. Also, the power systems may supply different voltages. Usually one power system is transformer-coupled to the other system. This is fine for providing power to operate equipment; however, the transformer attenuates the radio frequency signals required for the data signals transmission. Accordingly, the prior art has provided passive signal couplers to allow the data signals to bypass the transformers. These passive signal couplers couple the respective phases of the two power systems by means of a capacitor or a capacitor in series with an inductor.

This prior art solution, however, presents a serious safety hazard. In the event that a capacitor shorts out, then the two power distribution systems which may be supplying different voltages will be directly connected and may result in serious equipment damage and possibly fire. It may be that the fuse breakers will prevent damage. However, now there is the problem of having a building without power and locating the source of the power failure before the building may again be used for its normal business function.

OBJECTS OF THE INVENTION

Accordingly, it is an object of the invention to provide an improved data communication system wherein data signals are transmitted over power lines.

It is another object of the invention wherein improved apparatus couples two power distribution systems thereby allowing data signals to transfer from the power lines of one distribution system to the power lines of another distribution system.

It is yet another object of the invention wherein the improved apparatus greatly reduces or eliminates completely the safety hazard of coupling two power distribution systems when the power lines of each system are used for the transfer of data signals.

SUMMARY OF THE INVENTION

A number of AC voltage lines may be tapped off from a main power line by individual transformers to supply power for miscellaneous devices. Some of the devices which receive their power from these feeder voltage lines use the power system conductors to transmit and receive data signals generated at a radio frequency (RF). It may be that the two devices communicating with each other are on different power feeder lines. The power transformers designed to operate efficiently at 50/60 hertz will not transfer the RF data signals in the order of kilohertz, therefore a passive signal coupler is wired in parallel with the power transformer.

Each phase leg and the neutral leg of the passive signal coupler includes a series LC network tuned to the carrier frequency of the data signal.

A transformer included in the passive signal coupler made up of a toroidal core and having the primary and secondary windings bifilar wound passes the RF data signal from one power line distribution system to the other without introducing the safety hazards. The insulation in the windings can withstand the high voltages which may be induced.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 2 is a circuit diagram of the passive signal coupler;

FIGS. 3 and 4 are circuit diagrams of the prior art passive signal couplers.

DESCRIPTION OF THE PREFERRED EMBODIMENT

Figure 1:
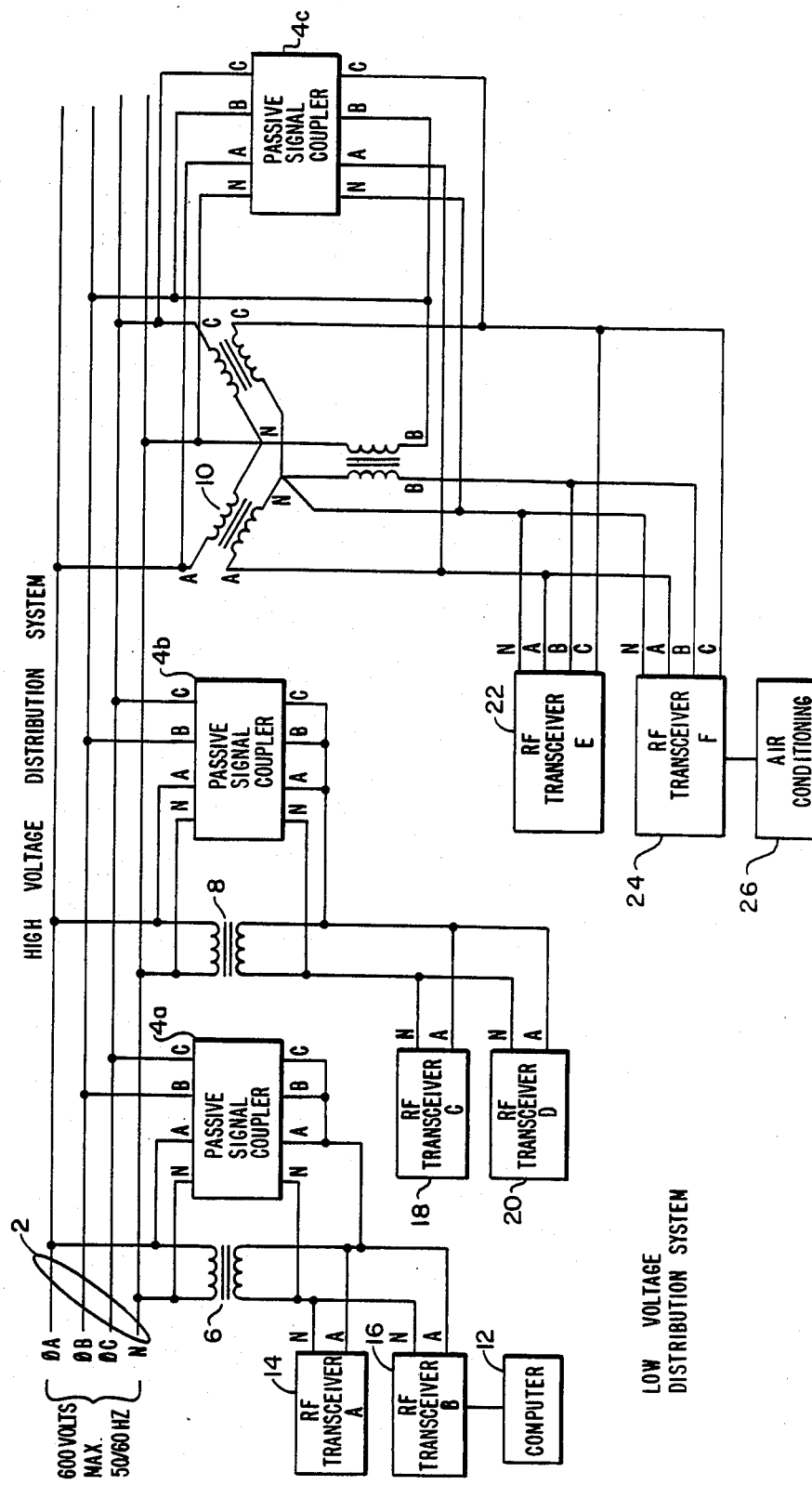
FIG. 1 is an overall block diagram of the power systems including typically devices transmitting and receiving data signals.

FIG. 1 is a block diagram of a portion of an overall communications system wherein data signals are transferred between transceivers over existing AC power lines.

A high voltage AC power line 2 supplies power to a building or a complex of buildings. The input voltage applied to power line 2 would typically be a maximum of 600 volts, 3 phase, 50 or 60 cycle. This could be stepped down by transformers 6, 8 or 10 to one of a number of secondary voltages including a 480 V/277 V wye, a 208 V/120 V wye, a 480 V delta, a 240 V/120 V delta (three phase) or a 120 V/240 V delta (single phase).

Coupled to the secondary voltage power lines are a number of radio frequency (RF) transceivers. Coupled across the secondary power lines from transformer 6 are an RF transceiver A 14 and an RF transceiver B 16. Coupled across the secondary power lines of transformer 8 are an RF transceiver C 18 and an RF transceiver D 20. Coupled across the secondary power lines of wye transformer 10 are an RF transceiver E 22 and an RF transceiver F 24.

Each of the transceivers 14 through 20 may be either a TM 740 B master transceiver or a TR 740 B remote transceiver. The TM 740 B master transceiver exchanges communication data between an application unit, typically a computer, directly coupled to the master transceiver and the remote transceiver. The TR 740 B remote transceiver receives and transmits data information over AC power lines using a power line carrier RF signal. The remote transceiver responds to commands and requests for communication only from the master transceiver and only when commanded.

The TR 740 B is described in the Honeywell "Remote Transceiver For Two-Way Power Line Carrier System", Form No. 51-8014, dated November 1982. The TM 740 B is described in the "Master Transceiver For Two-Way Power Line Carrier System", Form No. 51-8013, dated November 1982. These documents may be ordered from Honeywell Inc. CC&S, Honeywell Plaza, Minneapolis, MN 55408.

As an example, a computer 12 may be coupled to master transceiver B 16. An air conditioning system 26 may be coupled to remote transceiver F 24. Under computer 12 control, master transceiver B 16 may send status request data signals to remote transceiver F 24 to query the temperature and humidity of the area controlled by the air conditioning system 26. The remote transceiver F 24 would transmit the data signals containing the temperature and humidity received from the air conditioning system 26 to the master receiver B 16. The computer 12, upon receiving the temperature and humidity data signals from the master transceiver B 16, would send out new status information to the air conditioning system 26 if the computer 12 determined that the temperature or humidity was reading beyond either a high or low limit.

The data signals are represented by a carrier signal of 231.5 kilohertz for a logic ZERO and 234.5 kilohertz for a logic ONE for two-way data transmission. The data transmission rate is typically at a baud rate of 1200. This invention is not limited to these carrier frequencies of the 1200 baud rate. The amplitude of the carrier signal may vary between 0.01 volts and 10 volts peak-to-peak. For one-way data transmission, the carrier frequencies are 130 kilohertz for a logic ZERO and 131 kilohertz for a logic ONE. Also the transmission rate is typically, but not limited to, 300 baud.

Since the RF transceivers 14 through 24 are transformer-coupled to power line 2, and the transformers 6, 8 and 10 will not pass the RF frequency data signals, a passive signal coupler 4 is required to bypass each transformer 6, 8 and 10. The transformers 6, 8 and 10 are designed to operate most efficiently at 50/60 hertz. The passive signal coupler transfers the data carrier signals from one power system to another power system by bypassing the transformers 6, 8 and 10 coupling the power systems.

Referring back to the example, the 231.5 kilohertz and 234.5 kilohertz carrier data signals are transmitted between master transceiver 16 and remote transceiver 24 via the secondary power lines of transformer 6, passive signal coupler 4a, power lines 2, passive signal coupler 4c, and the secondary power lines of transformer 10.

Note that passive signal coupler 4a is coupled to a wire single phase power line (neutral and phase A) and passive signal coupler 4c is coupled to a 4 wire three phase power line (neutral, phase A, phase B, and phase C).

If the system includes a master transmitter communicating with a remote receiver wherein the data signals are transmitted in one direction only, that is, from the master transmitter to the remote receiver, then the data signal carrier frequency is 130 kilohertz. If the transmission is bi-directional, then the data signal carrier frequency is 233 kilohertz. This has the advantage of using the same power line for carrying data signals, simultaneously, to perform different functions. Of course, this would require two passive signal couplers in parallel, one for each frequency.

Referring to FIG. 2, the passive signal couplers 4a, 4b and 4c to pass the 130 kilohertz frequency include a tuned network in each phase power line and the neutral line which is made up of a 0.056 microfarad capacitor in series with a 27 microhenry inductance. The passive signal couplers 4a, 4b and 4c to pass the 233 kilohertz frequency include a tuned network in each phase power line and the neutral line with a 0.033 microfarad capacitor in series with a 15 microhenry inductance.

Each network is coupled between a transformer 4-2 and either a phase of power distribution A or power distribution B. Therefore, data signals will readily pass through a phase A1 of power distribution system A, a capacitor C1, and inductance L1, a first winding of transformer 4-2, an inductance L4, a capacitance C4 and neutral N1. The 130 kilohertz signal or 233 kilohertz signal will be induced in a second winding of transformer 4-2 and appear across phase A2 and N2 of power distribution system B. This assumes that both the master transceiver and the remote transceiver are coupled to a 2 wire power line. If they are coupled to three and four wire power lines, then the respective phase signals will be transmitted across transformer 4-2.

FIGS. 3 and 4 show the prior art phase signal couplers wherein the capacitor or a capacitor/inductance network is coupled between the respective phases of two power distribution systems. Note that a defective capacitor could short together two power systems supplying different voltages with possible serious impact. This invention requires at least three component failures to short the power systems.

Figure 5:
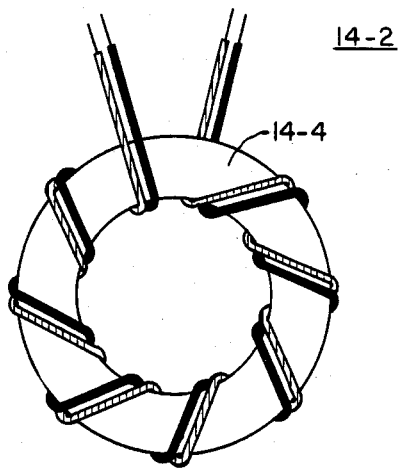
FIG. 5 is a detailed drawing of the transformer of the passive signal coupler.

FIG. 5 shows the mechanical structure of transformer T1 4-2 of FIG. 2. The core 14-4 is typically a toroidal core with a typical outside diameter of 0.870 inches, a typical inside diameter of 0.540 inches and a typical thickness of 0.250 inches. The insulation manufactured to a Underwriters Laboratories 1015 standard is essential as is the seven turns of the two wires, bifilar wound. That is, in each turn the two wires are adjacent to each other. The reason for the two colors is for ease in inspection and assembly of the transformer T1 4-2 into the passive signal coupler.

The following table gives the magnetic properties of the toroidal core:

| | |
|---|---|
| Pulse Permeability at 1000 Gauss | 5500 ± 20% |
| Initial Permeability | 5000 ± 20% |
| Temperature Stability 10°-80° C. | ± 15% |
| Saturation Flux Density (2 oersteds) | 4000 Gauss |
| Remanence (2 oersteds) | 1000 Gauss |
| Coercivity (at H mx = 20) | .05 oersteds |
| Loss Factor at 100 kilohertz | $\leqq 20 \times 10^{-6}$ |
| Hystresis Factor 5-20 Gauss | $\leqq 1 \times 10^{-6}$ |
| Curie Temperature | $\geqq 140°$ C. |

The bifilar winding of the conductors around the toroidal core provides for improved magnetic coupling of the transformer. The passive signal coupler as configured in the invention requires the failure of three components to short between the two power distribution systems (2 capacitors and the toroidal core 14-4 winding).

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A passive signal coupler coupling a first alternating current (AC) power distribution system to a second AC power distribution for conducting radio frequency (RF) data signals from said first AC power distribution system to said second AC power distribution system thereby bypassing a power transformer which also couples said first and said second AC power distribution systems for passing AC power energy, said passive signal coupler comprising:
first means coupled to said first AC power distribution system for passing said RF data signals but not passing said AC power energy received from said first AC power distribution system;
second means coupled to said second AC power distribution system for passing said RF data signals but not passing said AC power energy to said second AC power distribution system; and
third means having a first winding wound around a core and a second winding wound around said core wherein said first winding is coupled to said first means for receiving said RF data signals and said second winding is coupled to said second means for generating said RF data signal for transmission over said second AC power distribution system.

2. The passive signal coupler of claim 1 wherein said first means comprises:
first LC network means tuned to pass a predetermined carrier frequency of said RF data signals but not pass a frequency of AC power energy.

3. The passive signal coupler of claim 2 wherein said first means further comprises:
a first plurality of signal lines, each coupled to its respective phase power line of said first AC power distribution system and another of said first plurality of signal lines coupled to a first neutral power line of said first AC power distribution system.

4. The passive signal coupler of claim 3 wherein said first LC network means includes a first plurality of series capacitor/inductor circuits, each associated with one of said plurality of signal lines for passing said RF data signal on said respective first phase power line and said first neutral power line.

5. The passive signal coupler of claim 4 wherein each of said first plurality of signal lines coupled to said respective first phase power line is coupled in common to a first end of said first winding, and said first neutral power line is coupled to a second end of said first winding.

6. The passive signal coupler of claim 5 wherein said first and said second windings are wound around said core.

7. The passive signal coupler of claim 6 wherein said first and said second windings are each single conductors with insulation manufactured to a predetermined specification.

8. The passive signal coupler of claim 7 wherein said second means comprises:
second LC network means tuned to pass said predetermined carrier frequency of said RF data signals but not pass said frequency of said AC power energy.

9. The passive signal coupler of claim 8 wherein said second means further comprises:
a second plurality of signal lines, each coupled to its respective phase power line of said second AC power distribution system and another of said second plurality of signal lines coupled to a second neutral power line of said second AC power distribution system.

10. The passive signal coupler of claim 9 wherein said second LC network means includes a second plurality of series capacitor/inductor circuits, each associated with one of said second plurality of signal lines for passing said RF data signal on its respective second phase power line and said second neutral power line.

11. The passive signal coupler of claim 10 wherein each of said second plurality of signal lines coupled to said respective second phase power line is coupled in common to a first end of said second winding and said second neutral line is coupled to a second end of said second winding.

12. The passive signal coupler of claim 11 wherein the value of each capacitor of said first and said second LC network means is 0.056 microfarads and the value of each inductor of said first and said second LC network means is 27 microhenries to pass said carrier frequency of 130 kilohertz.

13. The passive signal coupler of claim 12 wherein the value of said each capacitor is 0.033 microfarads and the value of said each inductor is 15 microhenries to pass said carrier frequency of 233 kilohertz.

14. The passive signal coupler of claim 7 wherein said predetermined specification to which said insulation is manufactured is Underwriters Laboratories 1015.

* * * * *